June 26, 1951  P. B. LARSEN  2,557,981
NAVIGATIONAL INSTRUMENT
Filed Sept. 17, 1945
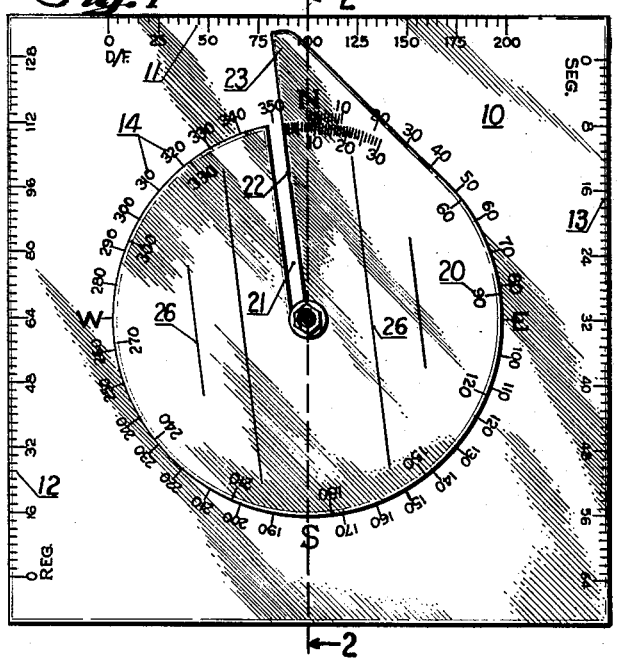
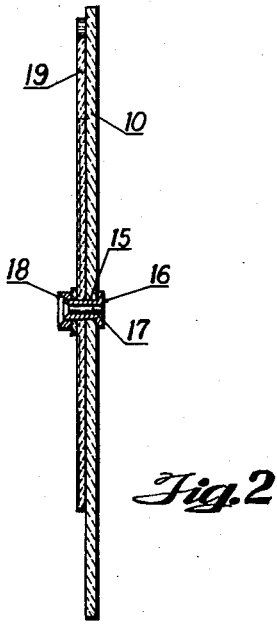
Inventor
PAUL B. LARSEN
By Ralph L. Chappell
Attorney Patented June 26, 1951

2,557,981

UNITED STATES PATENT OFFICE 2,557,981

NAVIGATIONAL INSTRUMENT

Paul B. Larsen, United States Navy

Application September 17, 1945, Serial No. 616,945

2 Claims. (Cl. 33—76)

(Granted under the act of March 3, 1883, as amended April 30, 1928; 370 O. G. 757)

The present invention relates to new and useful improvements in computing instruments, and more particularly to improvements in computing instruments, and more particularly to improvements in instruments for computing and solving problems involved in navigation of aircraft, or the like.

In general, the invention is concerned with the provision of a navigational instrument which is adapted to solve certain navigational problems, such as the location of a navigating craft, by means of bearings taken with respect to navigational aids. For instance, in aircraft navigation, the instrument may be conveniently employed for rapidly recording bearings taken on radio beacons in such a manner that the intersection of these bearings indicates the "fix" or location of the aircraft. To obtain the "fix," the entire instrument with the recorded bearing or station lines may be placed over a map or chart showing the location of the radio beacons from which the bearings were taken. By locating the recorded bearing lines over the corresponding radio stations on the map, the "fix" may be marked on the map at the intersection of the recorded station lines.

An object of the present invention is to provide an instrument of the above type which consists of a minimum number of parts and which may be rapidly and accurately manipulated to obtain a "fix."

Another object of the invention is to provide an instrument of the above type having concentric compass roses, one of which being rotatable relative to the other, and both being transparent so as to permit placing of the entire instrument on a map of the area over which the aircraft is navigating.

A still further object of the invention is to provide an instrument of the above type having a straight edge associated with one of the compass roses to facilitate marking of bearing or station lines taken from navigational aids.

The above and other objects will in part be obvious and will be hereinafter more fully pointed out.

In the accompanying drawings:

Fig. 1 is a top plan view of the navigational instrument;

Fig. 2 is a sectional view taken along the line 2—2 of Fig. 1; and

Fig. 3 is a top plan view of the instrument as placed on a map showing certain previously taken bearing lines aligned with the appropriate navigational aids on the map.

Referring more in detail to the accompanying drawings, the instrument is illustrated as including a base member 10 of "Plexiglas" or other suitable transparent material. The base 10 is of square or rectangular configuration so as to provide straight edges which are calibrated according to various distance scales which may be encountered during problems of navigation. Thus, the base is illustrated as being provided with a D/F or direction finder scale 11 calibrated according to distances encountered on radio direction finder charts or maps of the particular area over which the craft is travelling. Similarly, for navigation over smaller areas, the base is provided with a regional distance scale 12 adapted for use with regional maps and with a sectional distance scale 13 adapted for use with sectional maps within a certain region. The base 10 is provided with stationary compass rose markings 14 and with an opening 15 therethrough centrally located with respect to the compass rose 14.

An externally threaded cylindrical screw 16 extends through the opening 15 and is provided with an axial passage 17 therethrough. A securing nut 18 is adapted to threadedly engage the screw 16 after location of a movable compass rose 19. The compass rose 19 is thus concentrically mounted with respect to the fixed compass rose 14 and is adapted to be rotated about the screw 16 as a pivot. The movable compass rose 19 is transparent and is provided with suitable scale markings 20 in degrees and is further provided with a radial slot 21, one edge 22 of which is exactly lined with the center axis of the pivot screw 16. The edge 22 provides a straight edge and is extended beyond the fixed compass rose 14, as shown at 23.

As an example, the instrument may be conveniently employed for obtaining a radio "fix" during travel of an aircraft over any known area, the pilot being, of course, supplied with a suitable map of the area showing the location of radio beacons or other navigational aids. The use of the instrument obviates the necessity of printing various compass roses on the charts or maps which are used in connection therewith. In obtaining the "fix" by radio bearings, it is merely necessary for the pilot to hold a steady heading during the time required for taking the bearings. Usually three radio bearings are sufficient, and each should be identified in the usual manner. In determining a "fix" the zero index "N" on the fixed or bottom compass rose 14 is always the heading of the aircraft; the top compass rose is turned with the straight edge 22, 23 marking the radio bearing in degrees on the bottom compass rose 14; with a pencil or other marking device, this radio bearing is recorded by drawing a light line and properly labeling the same with the station identification. This procedure is followed for recording two other radio bearings. As illustrated in Fig. 3, the lines of the radio bearings have been marked with the appropriate station identification. Thus, the stations have been identified as CW, CX and CY. By placing the instrument over a map or chart 25 with the bearing lines CW, CX and CY aligned with the corresponding radio range stations, CW, CX and CY, as shown in Fig. 3, the radio "fix" may be marked on the map by a pencil or other instrument passed through the axial passage 17 in the pivot screw 16.

In order to prove the accuracy of the "fix" when the compass heading is known, and while the instrument is properly positioned on the chart, as shown in Fig. 3, the top compass rose 19 is turned until the parallel lines 26 thereon are parallel with a central meridian on the chart beneath the instrument. The true heading of the aircraft is read from the top compass rose directly in line with north on the bottom compass rose. Compass deviation can be determined and variations may be applied to obtain magnetic heading.

While one form of the invention has been shown for purposes of illustration, it is to be clearly understood that various changes in the details of construction, arrangement of parts and manner of solving various types of problems may be accomplished without departing from the scope of the invention as set forth in the appended claims.

The invention described herein may be manufactured and used by or for the Government of the United States of America for governmental purposes without the payment of any royalties thereon or therefor.

What I claim is:

1. A navigational instrument for determining a "fix" and true heading of an aircraft in flight with respect to a map of the region being flown over, said map having radio beacon stations indicated thereon, comprising a transparent base member having a compass rose with a heading index marked thereon, a rotatable compass rose member formed of transparent material mounted on said base member concentrically with respect to said bottom compass rose, and in registration therewith, with directional indicia around the entire periphery thereof, a centrally apertured pivot for connecting said rotatable compass rose member to said base member for free rotation thereover, means providing a straight edge in radial alignment with the axis of said apertured pivot and extended beyond said rotatable compass rose for marking radio beacon bearing lines on said base member, and means representing lines spaced from and parallel to said straight edge on said rotatable compass rose, the entire instrument placeable on said map of the region being flown over with said bearing lines aligned with the corresponding radio beacon stations, said centrally apertured pivot member permitting marking of the intersection of said bearing lines to obtain a "fix" and said heading index indicating the true heading of the aircraft upon rotation of said rotatable compass rose to a position in which said inscribed lines are parallel with the map meridians.

2. The instrument as defined in claim 1 with the straight edge means extending inwardly as a slot from said rotatable rose member edge to the rose pivot.

PAUL B. LARSEN.

REFERENCES CITED

The following references are of record in the file of this patent:

UNITED STATES PATENTS

| Number | Name | Date |
| --- | --- | --- |
| 679,662 | Almorth | July 30, 1901 |
| 1,226,141 | Sterling et al. | May 15, 1917 |
| 2,004,951 | Jensen | June 18, 1935 |
| 2,013,603 | Dalton | Sept. 3, 1935 |
| 2,026,537 | Jensen | Jan. 7, 1936 |
| 2,216,490 | Garrett | Oct. 1, 1940 |
| 2,238,190 | Sawtelle | Apr. 15, 1941 |
| 2,393,873 | Thurston | Jan. 29, 1946 |
| 2,438,730 | Watter | Mar. 30, 1948 |

FOREIGN PATENTS

| Number | Country | Date |
| --- | --- | --- |
| 2,854 | Great Britain | Feb. 6, 1906 |
| 19,570 | Great Britain | Oct. 15, 1894 |
| 124,329 | Great Britain | Mar. 27, 1919 |
| 584,624 | Germany | Sept. 23, 1933 |